United States Patent [19]
Roig et al.

[11] Patent Number: 5,175,010
[45] Date of Patent: Dec. 29, 1992

[54] BREAD CRUMB MANUFACTURE

[75] Inventors: Daniel J. Roig, St. Charles, Ill.;
Mario P. de Figueiredo, Chesterfield, Mo.

[73] Assignee: DCA Food Industries, Inc., Garden City, N.Y.

[21] Appl. No.: 740,305

[22] Filed: Aug. 5, 1991

[51] Int. Cl.$^5$ ................................. A21D 8/00
[52] U.S. Cl. ......................... 426/19; 426/21; 426/523; 426/549; 426/551
[58] Field of Search ............. 426/549, 19, 21, 551, 426/523

[56] References Cited

U.S. PATENT DOCUMENTS

| | | |
|---|---|---|
| 3,870,806 | 3/1975 | Capossela et al. . |
| 4,068,009 | 1/1978 | Rispoli et al. . |
| 4,207,346 | 6/1980 | Wauters et al. . |
| 4,218,480 | 8/1980 | Dyson et al. . |
| 4,364,961 | 12/1982 | Darley et al. . |
| 4,440,793 | 4/1984 | Seki . |
| 4,481,222 | 11/1984 | Fan ........................ 426/19 |
| 4,568,550 | 2/1986 | Fulger et al. . |
| 4,609,557 | 9/1986 | Mao et al. ............... 426/19 |
| 4,609,558 | 9/1986 | Giacone et al. ......... 426/19 |
| 4,615,895 | 10/1986 | Bhattacharjee ......... 426/523 |
| 4,622,225 | 11/1986 | Tu et al. . |
| 4,701,340 | 10/1987 | Bratton et al. ......... 426/523 |

FOREIGN PATENT DOCUMENTS 2118016 10/1983 United Kingdom .................. 426/19

Primary Examiner—Jeanette Hunter
Assistant Examiner—Mary S. Mims
Attorney, Agent, or Firm—Amster, Rothstein & Ebenstein

[57] ABSTRACT

A process for continuously manufacturing a farinaceous product similar to bread crumbs in texture, shape and taste properties, without fermenting, proofing, loafing, or resting the dough, including the steps of continuously mixing a dry composition including flour, chemical leavening, and minor amounts of a dough conditioner, miscellaneous ingredients, and optionally dry yeast with a brew including water, hydrogenated vegetable oil and optionally hydrated yeast to form a dough. The dough is fed through rollers to form a dough sheet, and the dough sheet is baked in a continuous oven to develop an open cellular structure therein during baking. Finally, the baked dough sheet is comminuted into crumbs by grinding and drying the same.

18 Claims, 1 Drawing Sheet

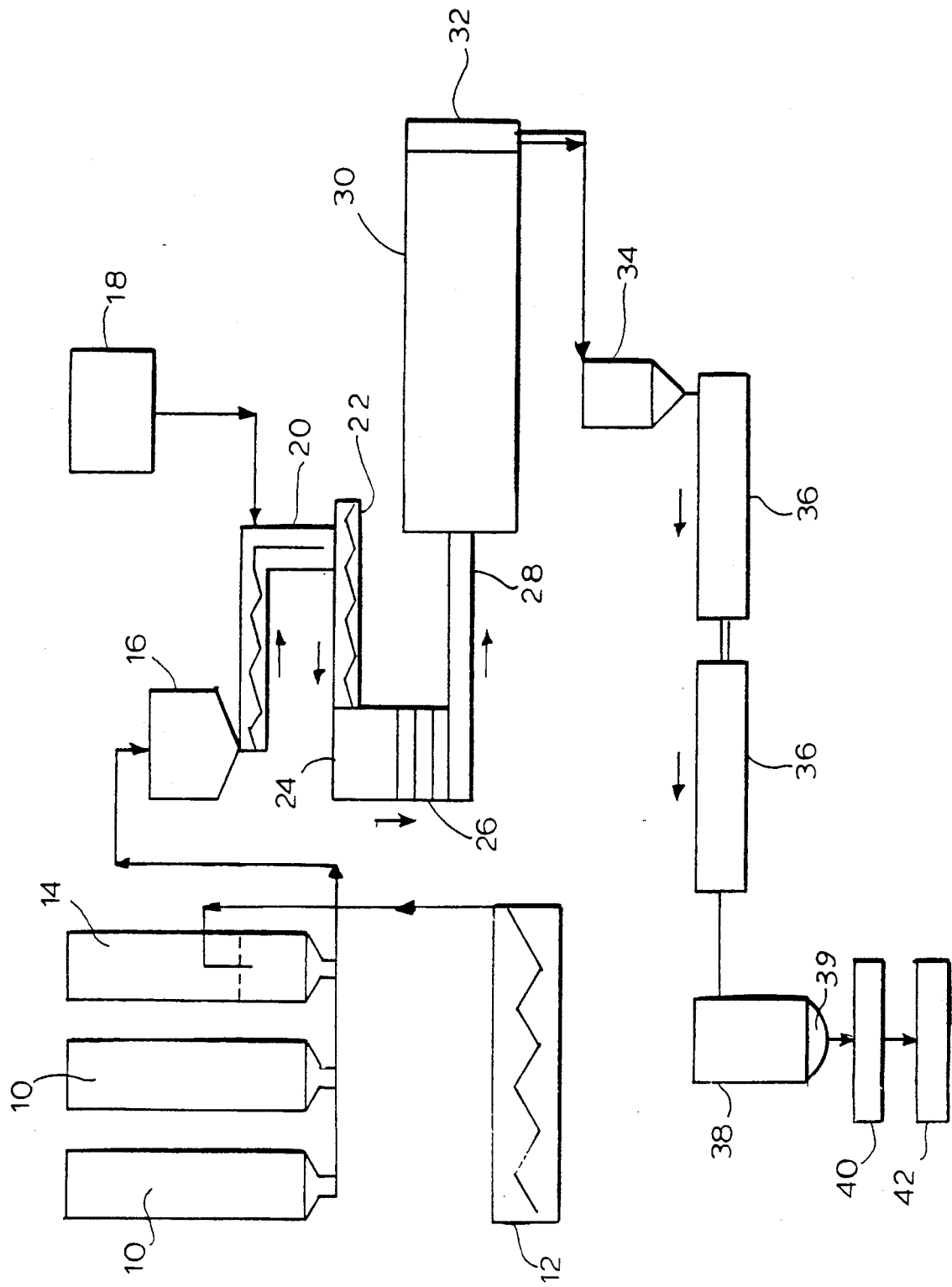

BREAD CRUMB MANUFACTURE

BACKGROUND OF THE INVENTION

The present invention relates to a process for continuously manufacturing a farinaceous product similar to bread crumbs in texture, shape and taste properties, and more particularly to such a process which does not require fermenting, proofing, loafing, or resting the dough.

Traditionally, dry bread crumbs of the type used in stuffings, coatings, and the like are produced by grinding, drying and sifting bread loaves or by an extrusion-type cooking of farinaceous materials followed by grinding, drying and sifting. In the conventional production of bread crumbs from bread loaves, the open cellular structure characteristic of bread crumbs is developed during the intermediate steps of fermentation, loafing and proofing and is only set by the baking process. In the conventional method of producing crumbs from an extrusion, the open cellular structure characteristic of bread crumbs is produced by the change in pressure as the cooked product is released from the extruder. Thus, in neither of these processes is the open cellular structure characteristic of bread crumbs actually developed during the baking of the dough.

Each of these processes has its own characteristic disadvantages. The production of bread crumbs through fermenting, proofing, loafing and resting is an elaborate, time-consuming and arduous process requiring about two to three hours from beginning to end (that is, from the mixing of the ingredients through the baking of the bread). The bread is thereafter allowed to stale for a minimum of 12 hours before being ground into bread crumbs. Thus the bread crumb making cycle is in excess of 14 hours. The production of bread crumbs through an extrusion/cooking process (with the cooking being accomplished through a combination of steaming and pressure during the extrusion process) requires the use of sophisticated extrusion equipment and results in an inferior product which tends to develop color spots during storage in a freezer.

Accordingly, it is an object of the present invention to provide a process for continuously manufacturing a farinaceous product similar to bread crumbs in texture, shape and taste properties.

Another object is to provide such a process which does not require fermenting, proofing, loafing or resting of the dough or staling of the baked product.

A further object is to provide such a process which does not require the use of expensive extruding equipment.

It is another object of the present invention to provide such a process in which the open cellular structure is developed during the baking step.

It is a further object to provide such a process which is fast, requiring in specific instances only about fifteen minutes from beginning to end.

It is also an object to provide such a process which is simple, economical, and produces a consistent high quality product.

SUMMARY OF THE INVENTION

It has now been found that the above and related objects of the present invention are obtained in a process for continuously manufacturing a farinaceous product similar to bread crumbs in texture, shape and taste properties, without fermenting, proofing, loafing, or resting the dough. The process comprises the steps of continuously mixing a dry composition including flour, chemical leavening, and minor amounts of a dough conditioner, miscellaneous ingredients, and optionally dry yeast with a brew including water, hydrogenated vegetable oil, and optionally hydrated yeast (if no dry yeast is in the dry composition) to form a dough. The dough is fed through rollers to form a dough sheet, and the dough sheet is baked to develop an open cellular structure therein during baking. Finally, the baked dough sheet is comminuted into crumbs by grinding and drying the same.

Preferably, the dry composition, if containing instant dry yeast, is mixed with a brew including water, hydrogenated vegetable oil and optional other liquid ingredients (or, if hydrated yeast is used in the brew, a brew containing water, hydrogented vegetable oil hydrated yeast, and optional other liquid ingredients at a pH of 5–6) to form a dough having a moisture content of about 34–39% by weight, the mixing being performed by a mixer having a low rotational speed for less than one minute. Then the dough is fed through rollers to form a dough sheet having a thickness of about 0.25 inch, and the dough sheet is baked in a continuous oven at about 500°–750° F. for about 4–6 minutes, with the baking temperature being below that required to kill the yeast immediately. Ultimately the crumbs are dried to a moisture content of about 4–12% by weight. The entire process may be performed in less than 15 minutes.

In a preferred embodiment, the flour is selected from the group consisting of hard wheat flour, soft wheat flour and combinations thereof (optionally with gelatinized wheat starch), the chemical leavening is selected from the group consisting of sodium bicarbonate, glucono delta lactone, sodium aluminum phosphate, sodium acid pyrophosphate and combinations thereof, the dough conditioner is selected from the group consisting of dextrin, L-cysteine, calcium peroxide, potassium iodate and combinations thereof, the miscellaneous ingredients are selected from a group consisting of salt, sucrose, dextrose and combinations thereof, and the hydrogenated vegetable oil is a salad oil selected from the group consisting of soybean oil, cottonseed oil and combinations thereof.

Preferably the dry composition includes about 85–96% flour and about 2–6.5% by weight chemical leavening. The flour has a protein content of about 10.5–12.5% by weight, the chemical leavening is heat activatable, and the dough conditioners include both dextrin and L-cysteine. The dough also includes yeast, whether from the dry composition or the liquid ingredients of the brew.

BRIEF DESCRIPTION OF THE DRAWING

The above and related objects, features and advantages of the present invention will be more fully understood from the following detailed description of the presently preferred, albeit illustrative, embodiments of the present invention when taken in conjunction with the accompanying drawing wherein:

FIG. 1 is a flow chart schematically indicating the process of the present invention.

DETAILED DESCRIPTION OF THE PREFERRED EMBODIMENTS

Referring now to the drawing, and in particular to FIG. 1 thereof, therein illustrated is a process according to the present invention for continuously manufacturing a farinaceous product similar to bread crumbs in texture, shape and taste properties. The process does not require fermenting, proofing, loafing or resting of the dough or the use of expensive extrusion equipment.

In the initial step of the process, a dry composition is mixed with a liquid composition in order to form a dough. The dry composition includes flour, chemical leavening, and minor amounts of a dough conditioner, miscellaneous ingredients, and optionally yeast.

The flour is preferably a flour with a protein content of about 10.5-12.5% by weight, selected from the group consisting of hard wheat flour, soft wheat flour and combinations thereof. Gelatinized wheat starch (GWS) is not a flour, but may be used along with true flours (but not alone) to form the flour ingredient. The chemical leavening is preferably a heat activatable chemical leavening selected from the group consisting of sodium bicarbonate, glucono delta lactone, sodium aluminum phosphate, sodium acid pyrophosphate, and combinations thereof. The dough conditioner is preferably selected from the group consisting of dextrin, L-cysteine, calcium peroxide, potassium iodate, and combinations thereof, with the use of both dextrin and L-cysteine in combination being preferred. The miscellaneous ingredients are preferably selected from the group consisting of salt, sucrose, dextrose, and combinations thereof. The dry composition may also include other ingredients, such as minor amounts of flavorings, colorants and the like.

In addition to the preferred ingredients identified above, a variety of other conventional ingredients may be used. For example, the flour may be rice, corn, oat, rye, wholewheat, barley, vital wheat gluten, and combinations thereof. The chemical leavening may be monocalcium phosphate, cream of tartar, potassium bicarbonate, ammonium bicarbonate, sodium aluminum sulphate, lactic acid, malic acid, citric phosphate, dicalcium phosphate, and combinations thereof. The dough conditioner may be ascorbic acid, sodium or calcium stearoyl lactylate, diacetyl tartaric acid ester monoglyceride, polysorbate 80, and combinations thereof. The miscellaneous ingredients may include lactose, fructose, maltose, and combinations thereof as the sugars.

Preferably 100 parts of the dry composition include about 85-96 parts (preferably 89-93.5 parts) flour (including any GWS), about 2.0-6.5 parts (preferably 3.0-6.0 parts) chemical leavening, about 0.04-1.10 parts (preferably 0.50-0.75 parts) dough conditioner, about 0.01-8.0 parts (preferably 0.05-2.0 parts) sugar, about 0.20-2.0 parts (preferably 0.30-1.0 parts) salt, and optionally small amounts of other ingredients. The dry composition may additionally include yeast, such as compressed yeast or instant active dry yeast. About 0-10.0 parts (preferably 1.0-2.5 parts) yeast are used per 100 parts by weight of the dry composition.

It will be appreciated by those skilled in the art that dextrin (a partially hydrolyzed starch available from D. D. Williamson of Louisville, Ky.) and L-cysteine (an amino acid available from Skymart Enterprises of San Gabriel, Calif.) are ingredients often used in conventional bread making as dough conditioners to make the dough composition hydrate and flow faster. These two dough conditioners are preferably used in combination in the present invention, although, where applicable laws do not restrict the quantity of each which may be used, one may be used to the exclusion of the other.

The dough conditioners enable hydration of the dough faster and development of dough agglomerates (i.e., work the gluten of the dough to develop membranes for gas retention) in a shorter time using a mixer which imparts less energy to the dough. Accordingly, according to the present invention mixing typically requires about 30-45 seconds with an auger rather than the 10-20 minutes usually required with a powerful mixer to develop the dough for conventional sheeting. ("Developing time" refers to the time spent in the mixer while the dough is being kneaded in order to make the gluten of the flour elastic so that it will retain gas.)

The dry composition is continuously mixed with the brew of liquid ingredients including water, hydrogenated vegetable oil and optionally hydrated dry yeast. The hydrogenated vegetable oil is preferably a salad oil, such as soy bean oil or cottonseed oil, but may also be canola, corn, safflower, sunflower oil or combinations thereof. About 1.0-5.0 parts (preferably 1.2-2.0 parts) hydrogenated vegetable oil and about 0-30.0 parts of hydrated dry yeast are used per 100 parts of the dry composition.

It will be appreciated that yeast may be introduced into the system either as instant dry yeast (a solid ingredient of the dry composition), or as hydrated dry yeast (or compressed yeast as an ingredient of the liquid brew). In the latter case the brew is maintained at an appropriate pH such as 5-6.

The solid and liquid ingredients are continuously mixed to provide a moisture content for the dough of about 34-39% (preferably 36-37%) by weight. The pH of the resultant yeast-containing mix is maintained at about 5-6 (preferably 5.5-5.7), depending upon the type of yeast employed.

In the process the flour is typically stored in bulk flour tanks 10, with portions of the flour being pre-blended with other ingredients of the dry composition (such as chemical leavening, dough conditioners, salt and other miscellaneous ingredients, and optionally dry yeast) in a small ribbon blender 12 to produce a stream which is fed into a pre-mix tank 14. A mixture of dry material from the pre-mix tank 14 and the bulk flour tanks 10 is then fed into a flour-use bin 16. Concurrently, the liquid ingredients (such as water, salad oil, and optionally hydrated yeast, farinaceous materials such as cereal recovery, and emulsifiers) are mixed together in a liquid-brew tank 18.

The streams from the flour-use bin 16 and liquid-brew tank 18 are mixed together in a brew head 20 and then passed through a dough screw conveyer or auger 22 for deposit as dough in a dough box 24. The mixing of the dough may be performed with the auger in just about 30 to 45 seconds, as there is no need for fermenting, proofing, loafing or resting of the dough. In contrast to the conventional mixers which impart substantial amounts of energy to the dough and require prolonged mixing times of 13-20 minutes, the mixer useful in the present process may have a low rotational speed (e.g., about 135 rpm) and still perform adequate mixing in less than a minute, preferably in only 30-45 seconds. As hydration of the dough is critical to the present invention, the formulations preferably use no-time dough additives, heat-activatable chemical leavenings, flours with protein contents of 10.5-12.5% by weight, and optional wetting or emulsifying agents.

In the next step of the process, the dough is fed through rollers to form a dough sheet. Thus the dough from dough box 24 is passed through a three roll sheeter 26 (available from Werner-Lehara, now A.P.V. Baker Inc. of Grand Rapids, Mich. 49504) to form a dough sheet, preferably having an approximate thickness of 0.25 in. The dough sheet is deposited by the sheeter 26 onto a sheeter belt 28, which then transfers the sheet into a continuous bake-in oven 30. A preferred oven is a direct gas-fired oven with top and bottom burners (available from Werner-Lehara). In the oven, the dough sheet is baked to develop an open cellular structure therein. Baking is performed at 500°-750° F. (preferably 550°-615° F.) for a period of about 4-6 minutes (preferably 4.5-5.0 minutes). It will be appreciated that the baking of the dough sheet is accomplished at a temperature below that which would be required to kill the yeast immediately so that the yeast functions at least temporarily during the baking step.

The baked dough sheet is then comminuted into crumbs by grinding and drying the same. Thus the baked dough sheet leaving the oven 30 is passed through a breaker 32 such as a cracker breaker (available from Gruendler Cracker & Pulverizing Co. of Durand, Mich. 48429), where it is broken into approximately 1 inch pieces. The broken pieces are then conveyed through a grinder 34, such as a rigid rotor breaker (Model No. 42-2 available from Gruendler), where it is ground into the desired dimensions to provide the texture and shape of bread crumbs. The ground product is then passed to a dryer 36 where it is reduced to an appropriate moisture content for bread crumbs of about 4-12% (preferably 7-8%) by weight. Preferably a two-stage dryer 36 is employed (such as that available from Wittes Co. of Washington, N.J. 07882), the first stage being a hot-air dryer and the second stage being an ambient-air dryer.

The dried product leaving the dryer 36 is optionally stored in a storage tank 38 prior to being passed through a mill or grinder 39 which is preferably either a grinder (such as Model No. MDDB-1250 available from Buhler Miag, Inc. of Minneapolis, Minn. 55440) or a hammermill (such as Model No. P-42220 Series II available from Jacobson Machine Works, Inc. of Minneapolis, Minn. 55427). The particulate product is then passed through a sifter 40 (such as one including the pull off system Model No. 422A, main sifter Model No. 804A and scalp sifter Model No. 221A available from Rotex of Cincinnati, Ohio) to ensure an appropriate granulation of the product. Finally, the product may be used immediately or packaged using a conventional packer 42 (such as the Weigh Master II Model No. 4198 available from Chantland Co. of Humbolt, Iowa 50548).

The product is highly desirable in its consistency in terms of both color and texture.

To summarize, the process of the present invention enables the production of a farinaceous product similar to bread crumbs in texture, shape, and taste properties using readily commercially available equipment, with the time for the production of the product being reduced from 14-15 hours (including about 2-3 hours for bread production plus a minimum of 12 hours staling time) down to about 10-15 minutes. The process enables onion rings, chicken and various other foods to be coated or stuffed with bread crumbs without a complex and lengthy bread loaf-making process (during which the dough requires time to ferment, proof, loaf and rest) and a very lengthy staling period thereafter or a sophisticated extrusion process. According to the present invention, the open cellular structure is developed during the baking step. The entire process is simple and economical and produces a high quality product.

Now that the preferred embodiments of the present invention have been shown and described in detail, various modifications and improvements thereon will become readily apparent to those skilled in the art. Accordingly, the present invention is limited only by the spirit and scope of the appended claims, and not by the foregoing specification.

We claim:

1. A process for continuously manufacturing a farinaceous product similar to bread crumbs in texture, shape and taste properties, without fermenting, proofing, loafing, or resting the dough, comprising the steps of:
   (A) continuously mixing a dry composition including flour, chemical leavening, and a dough conditioner, with a brew including water and hydrogenated vegetable oil, to form a yeast-containing dough;
   (B) feeding the dough through rollers to form a dough sheet;
   (C) baking the dough sheet to develop an open cellular structure therein during baking; and
   (D) comminuting the baked dough sheet into crumbs by grinding and drying the same;
   the entire process being performed in less than 15 minutes.

2. The process of claim 1 wherein the dry composition includes about 85-96% flour and about 2-6.5% by weight chemical leavening.

3. The process of claim 1 wherein the dough conditioners include both dextrin and L-crysteine.

4. The process of claim 1 wherein the flour has a protein content of about 10.5-12.5% by weight.

5. The process of claim 1 wherein the flour is selected from the group consisting of hard wheat flour, soft wheat flour, and combinations thereof, alone or in combination with gelatinized wheat starch, the chemical leavening is selected from the group consisting of sodium bicarbonate, glucono delta lactone, sodium aluminum phosphate, sodium acid pyrophosphate and combinations thereof, and the dough conditioner is selected from the group consisting of dextrin, L-cysteine, calcium peroxide, potassium iodate and combinations thereof, and the miscellaneous ingredients are selected from a group consisting of salt, sucrose, dextrose and combinations thereof.

6. The process of claim 5 wherein the hydrogenated vegetable oil is a salad oil selected from the group consisting of soybean oil, cottonseed oil and combinations thereof.

7. The process of claim 1 wherein the chemical leavening is heat activatable.

8. The process of claim 1 wherein the brew has a pH of 5-6.

9. The process of claim 1 wherein the mixing is performed by a mixer having a low rotational speed for less than one minute.

10. The process of claim 1 wherein the dry composition is mixed with water and optional other liquid ingredients to form a dough having a moisture content of about 34-39% by weight.

11. The process of claim 1 wherein the dough is fed through rollers to form a dough sheet having a thickness of about 0.25 inch.

12. The process of claim 1 wherein the dough sheet is baked at about 500°-750° F. for about 4-6 minutes.

13. The process of claim 1 wherein the dough sheet is baked at a temperature below that required to kill the yeast immediately.

14. The process of claim 1 wherein the dough sheet is baked in a continuous oven.

15. The process of claim 1 wherein the crumbs are dried to a moisture content of about 4-12% by weight.

16. A process for continuously manufacturing a farinaceous product similar to bread crumbs in texture, shape and taste properties, without fermenting, proofing, loafing, or resting the dough, comprising the steps of:

(A) continuously mixing at a low rotational speed for less than one minute a dry composition including 85%-96% of a flour having a protein content of about 10.5-12.5% by weight selected from the group consisting of hard wheat flour, soft wheat flour, and combinations thereof, either alone or with gelatinized wheat starch, 2.65% by weight of a heat-activatable chemical leavening selected from the group consisting of sodium bicarbonate, glucono delta lactone, sodium aluminum phosphate, sodium acid pyrophosphate and combinations thereof, and small amounts of a dough conditioner selected from the group consisting of dextrin, L-cysteine, calcium peroxide, potassium iodate and combinations thereof, sugar, and salt, with a brew including water and hydrogentated vegetable oil, to form a yeast-containing dough having a moisture content of about 34-39% by weight;

(B) feeding the dough through rollers to form a dough sheet having a thickness of about 0.25 inch;

(C) baking the dough sheet in a continuous non-microwave, non-infrared oven at about 500°-575° F. for about 4-6 minutes to develop an open cellular structure therein during baking; and (D) comminuting the baked dough sheet into crumbs by grinding and drying the same to a moisture content of about 4-12% by weight;

the entire process being performed in less than 15 minutes.

17. The process of claim 16 wherein the dough conditioners are selected from the group consisting of dextrin, L-cysteine, and combinations thereof.

18. The process of claim 1 wherein said dough sheet is baked in a conventional non-microwave, non-infrared oven.

* * * * *